Dec. 9, 1958     C. D. MILLER     2,863,335
TORQUE LIMITER

Filed May 10, 1955     2 Sheets-Sheet 1

INVENTOR.
Carl David Miller
BY
*Frank H. Harmon*
ATTORNEY.

Dec. 9, 1958
C. D. MILLER
2,863,335
TORQUE LIMITER
Filed May 10, 1955
2 Sheets-Sheet 2
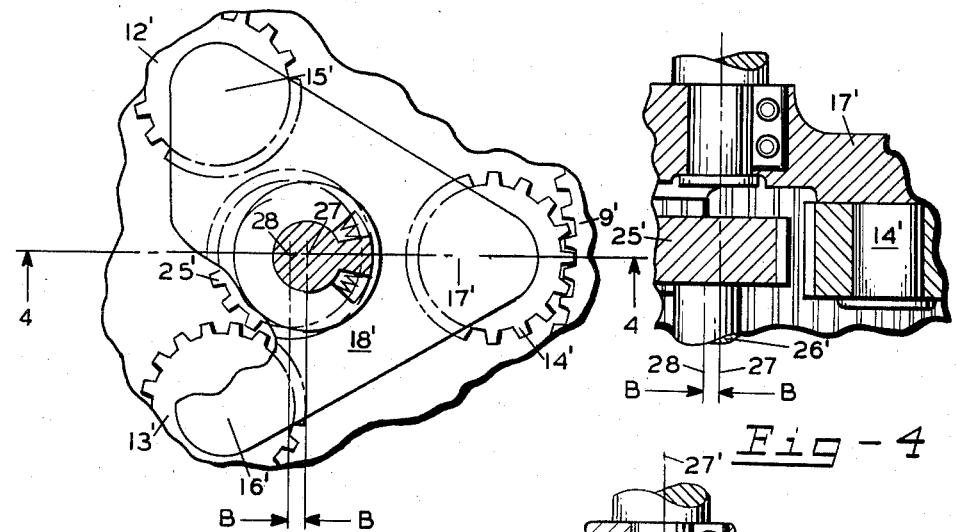
Fig-3
Fig-4
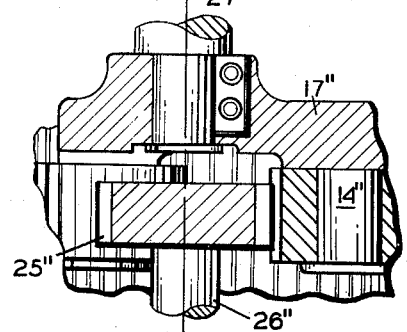
Fig-6
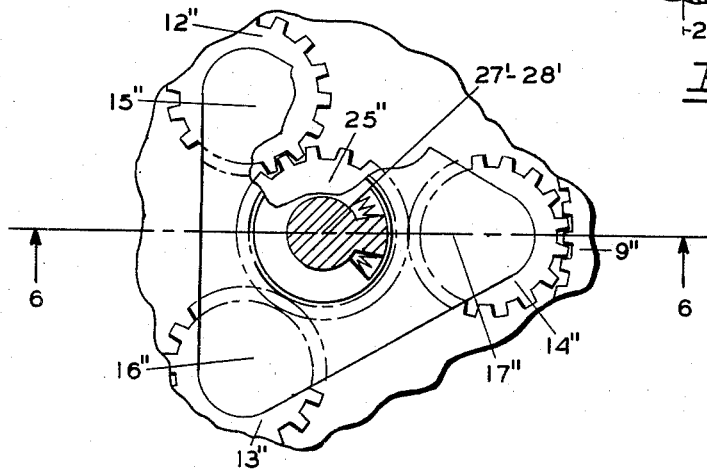
Fig-5
INVENTOR
CARL DAVID MILLER
BY Bosworth, Sessions,
Herrstrom & Knowles
ATTORNEYS United States Patent Office 2,863,335
Patented Dec. 9, 1958

2,863,335

TORQUE LIMITER

Carl David Miller, Columbus, Ohio, assignor, by mesne assignments, to Jack & Heintz, Inc., Cleveland, Ohio, a corporation of Delaware Application May 10, 1955, Serial No. 507,260

12 Claims. (Cl. 74—801)

This invention relates to improvements in torque-limiting devices and the like. More particularly, it relates to those employing a multiple friction disk assembly, and is especially adaptable to, but not limited to, planetary gear trains.

A conventional torque limiter for planetary gear trains consists of a pack of disks, steel internal gear disks being assembled alternately with externally splined bronze disks. The splined bronze disks mate with an internal spline in the gear housing. With the disk pack spring loaded axially, the internal gear disks form the fixed member (i. e. ring gear), under normal operating conditions, of a stage of planetary reduction gearing. When the torque load on the planetary gear carrying arm, or spider, increases sufficiently to overcome the friction between the spring-loaded disks, the internal gear disks slip, slowing down or stopping motion of the spider.

Because the coefficient of starting friction is higher than the coefficient of sliding friction, the torque load on the spider required to start the internal gear disks slipping is higher than that required to keep the disks slipping. This ratio of break-away torque to slipping torque is excessive when elements designed with a low factor of safety are required to be protected by the torque limiter.

In torque limiting devices used in connection with planetary gear trains, dynamic break-away torque is the maximum torque exerted on the planetary gear carrying arm, or spider, as the result of suddenly arresting the rotation of the carrying arm, such as by engagement with a fixed-jaw clutch. This causes the internal gear disks to slip while the input torque is still being applied to the sun gear of the planetary gearing stage. Dynamic break-away torque is distinguished from static break-away torque as the latter is the torque exerted on the spider when it is locked before input torque is applied to the sun gear, causing the internal gear disks to slip.

A primary object of the present invention is to provide an improved torque-limiting device that eliminates or reduces break-away torque under both dynamic and static conditions. Another object is to provide an improved torque limiter for planetary gear trains. Other important objects will be apparent from the following specification and claims.

The present invention provides as a feature a continuous forced relative movement between the interlocking sets of friction disks. Thus, whenever an excessive torque is imposed upon the torque-limiting device, the dynamic break-away torque is very nearly equal to the slipping torque and is considerably less than that of a conventional torque-limiting device with the same slip setting.

Fig. 3 is a simplified front view, partly in section, of another embodiment of the present invention which may be used with the basic system fully illustrated in Figs. 1 and 2.

Fig. 4 is a simplified sectional view taken in the plane 4—4 of Fig. 3.

Fig. 5 is a simplified front view, partly in section, of yet another embodiment of the present invention which may be used with the basic system fully illustrated in Figs. 1 and 2.

Fig. 6 is a simplified sectional view taken in the plane 6—6 of Fig. 5.

Figure 1:
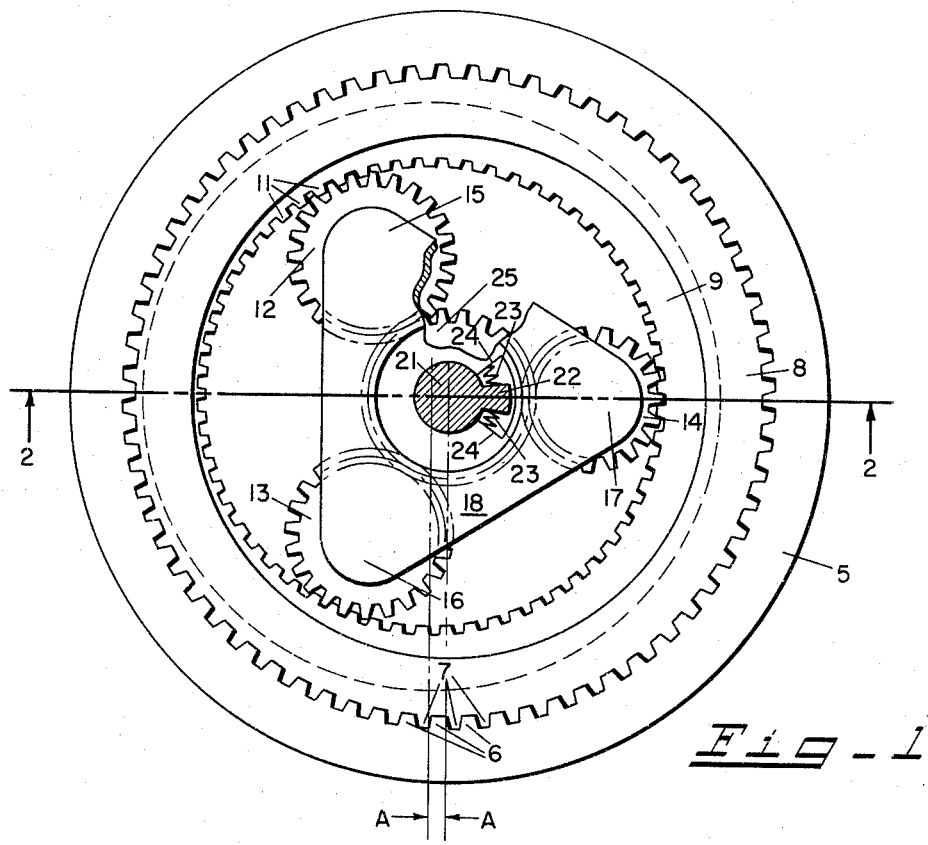
Fig. 1 is a front view, partly in section, of a planetary gear reduction system having a multiple friction disk torque-limiting device according to the present invention, showing one type of eccentricity which provides the desired motion of the internal ring gear.
Figure 2:
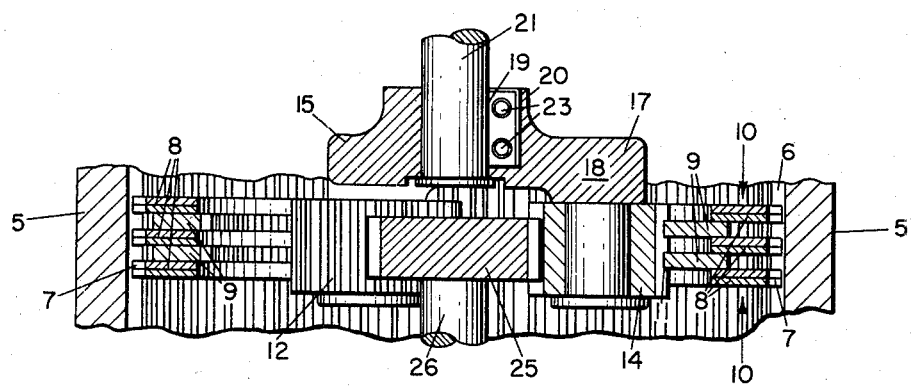
Fig. 2 is a sectional view taken in the plane 2—2 of Fig. 1.

Referring to Figs. 1 and 2, a housing 5 with a cylindrical interior is longitudinally splined with splines 6 which mate with the splines 7 on the exterior of a set of external friction plates 8, usually composed of Phosphor bronze. The splines 6 and 7 are designed to lock the external friction plates 8 from rotation with respect to the housing 5, while allowing longitudinal movement of the friction plates 8. A set of internal disks 9 is alternately bound with the external friction plates 8 by a loading pressure 10. The set of internal disks or friction plates 9 is preferably composed of steel. The internal friction disks 9 contain internal gear teeth 11 completely around their inside border. The set of internal friction plates 9 forms a ring gear 9 for three planetary gears 12, 13, and 14. These planetary gears 12, 13, and 14 are geared to the ring gear 9, and are mounted on carrying arms 15, 16, and 17. The carrying arms 15, 16, and 17 from the planetary gears 12, 13, and 14 form a one-piece spider 18 which is bored at 19 and contains a longitudinal key slot 20. An output shaft 21 is contained in the bore 19 of the spider 18, and the output shaft 21 has a male key 22 which is fitted into the slot 20. Coil springs 23 are fitted into the space between the male key 22 and the side walls 24 of the key slot 20 to form a spring key. A gear 25, commonly called a sun gear, is on an input shaft 26 and is geared internally to the planetary gears 12, 13, and 14. The lengths of the carrying arms 15, 16, and 17, the diameters of the planetary gears 12, 13, and 14, and the diameter of the sun gear 25 are made such as to provide meshing of the sun gear 25 with all three planetary gears 12, 13, and 14 at any position of the carrying arms 15, 16, and 17.

In operation, the input gear, or sun gear 25, drives the planetary gears 12, 13, and 14. These planetary gears 12, 13, and 14 ride internally on the ring gear which is the set of internal friction plates 9. When the loading pressure 10 is sufficient to bind these internal disks 9 to the external friction plates 8 without relative movement therebetween, the internal disks 9 must be stationary. This is because the external disks 8 are splined to the housing 5 in order to lock them from rotation. Thus, when the ring gear 9 remains stationary, the planetary gears 12, 13, and 14 revolve as the sun gear 25 rotates. This movement of the planetary gears 12, 13, and 14 is in the same direction as the rotation of the sun gear 25 but at a slower rate. Since the planetary gears 12, 13, and 14 are mounted on carrying arms 15, 16, and 17 forming a spider 18, the spider 18 rotates at the same rate as the revolution of the planetary gears 12, 13, and 14. Since the spider 18 is keyed by a spring key 22 to the output shaft 21, rotation of the output shaft 21 results from an applied rotation to the input shaft 26. Of course, the rotation of the output shaft 21 is at a slower rate than that of the input shaft 26.

The arrangement described provides an ordinary planetary gear reduction stage, unless the torque transmitted is raised above that value of static friction which locks the external and internal friction disks 8 and 9. When that value is exceeded, the friction disks 8 and 9 begin to slide, limiting the torque which can be applied to the output shaft 21. This is because movement of the ring gear 9 takes place, stopping or slowing down the rotation of the planetary gears 12, 13, and 14. Conventionally, since the value of sliding friction is lower than the value of static friction, the torque which can be transmitted once the friction disks 8 and 9 begin to slide is much less than the torque value necessary to begin the sliding action.

According to that embodiment of the present invention shown by Figs. 1 and 2, two of planetary gears 12 and 13 are made larger than the third gear 14, the diameter of the gears and pitch of the teeth being arranged in such manner that the planetary gears 12, 13, and 14 can still ride on the ring gear 9. However, as the revolution of the planetary gears 12, 13, and 14 takes place, causing rotation of the spider 18, the internal ring gear 9 is forced to perform a circular wobble. That is, there is movement of the ring gear disks 9 in the plane of the disks 9 being forced by the eccentric construction of the planetary gear arrangement. The axis of the internal disks performs a circular movement. Thus, as the carrying arms 15, 16, and 17 revolve, there is a constant relative movement between the internal friction disks 9 and the external friction disks 8. When excessive torque is applied, therefore, only sliding friction need be overcome in order for the torque limiting device of the present invention to begin operation. The distance A—A of Fig. 1, representing the eccentricity of the ring gear axis as that axis rotates with the spider about the drive center, is exaggerated for purposes of illustration.

A very simple addition is necessary in order to adapt the present invention to the problem of break-away torque under static conditions, as well as dynamic conditions. That is, the problem of break-away torque with initially locked output is handled by connecting the spider 18 to the output shaft 21 with a spring key 22 or some equivalent arrangement. Such a spring-key arrangement provides an initial rotation of the spider 18 as input torque is applied, without the development of a substantial output torque, through such an angle as might prove to be most desirable. When positive engagement finally develops between the spider 18 and output shaft 21, the internal steel friction plates 9 already are well started on a circular wobble for the purpose of eliminating break-away torque.

According to the present invention, a continuous circular wobble of the steel friction plates comprising the ring gear is produced by certain types of eccentricity of the spider that carries the planetary gear or gears. This circular wobble keeps the steel friction plates in continuous motion relative to the Phosphor bronze plates, thus eliminating or reducing the high torque associated with the beginning of relative motion. The wobble produced by the eccentricity of the spider is a circular movement of the axis of the internal friction plates. This motion occurs at the same angular rate as the rotation of the spider, but without a consequent rotation of the internal friction plates about their axis. That is, a translation of the rotatable ring gear disks occurs with respect to the non-rotatable disks. Rotation of the internal friction plates about their axis, of course, occurs only as a result of attempting to transmit excessive torque.

Many alternative arrangements are useful in producing the desired wobble. For instance, in the embodiment above described the spider carries three pinions, two 12 and 13 of which are identical in diameter and the third 14 smaller. In an alternative embodiment, the third pinion 14 is of somewhat larger diameter than either of the other two. Of course, where pinion 14 is made larger than pinions 12 and 13, its carrying arm 17 is made proportionately longer so that meshing of all pinions 12, 13, and 14 with sun gear 25 is accomplished as before. Also alternatively, all pinions 12, 13, and 14 are used are constructed with different diameters. Again, of course, the spider 18 is constructed to insure complete meshing of the pinions 12, 13, and 14 with the sun gear 25. Hence, within the limitations that tooth pitch must be the same on all three pinions and that the circumferences of any two pinions must differ only by an integral number times the tooth pitch, considerable leeway exists for obtaining such diameter of wobble of the steel friction plates as might be found most desirable.

Another arrangement, illustrated by Figs. 3 and 4, involves rotation of the spider 18′ about an axis 27 somewhat displaced from the axis 28 of the input shaft 26′. The distance B—B of Figs. 3 and 4 represents this displacement. This distance B—B and the corresponding depths of engagement of the teeth are shown exaggerated for purposes of better illustration. The pinions 12′, 13′, and 14′ in the spider 18′ are all constructed with the same diameter with slight differences in lengths in the carrying arms 15′, 16′, and 17′. In Fig. 3, for example, the carrying arm 16′ is slightly shorter than carrying arms 15′ and 17′. With such an arrangement, each of the planetary pinions 12′, 13′, and 14′ in its rotation about the sun gear 25′ operates with varying depth of engagement and with a varying degree of back lash. However, the necessity for the variation in depth of engagement of the gear teeth constitutes a limitation of the diameter of the circle of wobble that could be used. Because the high friction associated with break-away torque reduces only gradually throughout the range of low velocities, a larger diameter of wobble might be needed than would be permissible with this alternative arrangement.

In another embodiment, illustrated by Figs. 5 and 6, this larger diameter of wobble is obtained by aligning the input and output axes 28′ and 27′, making one of the carrying arms 17″ longer than the other or others, and using pinions 12″, 13″, and 14″ of the same diameter on all of the carrying arms 15″, 16″, and 17″. Then all of the planetary gears but one 14″ completely mesh with the sun gear 25″ and the pinion 14″ on the longer carrying arm 17″ provides the necessary eccentricity to force a wobble of the ring gear. If desired, the pinion 14″ on the longer carrying arm 17″ is made a smaller diameter than the planetary gears 12″ and 13″, and acts as a "dummy" gear without meshing at all with the sun gear 25″. Of course, in this case, if pinion 14″ is made smaller, carrying arm 17″ is made proportionately longer to maintain the necessary eccentricity.

It is seen that the above embodiments are only a few of the many possible embodiments of the present invention in which an eccentricity of the planetary gear train is used to force a relative motion between the stationary outer set of friction disks and the rotatable inner set of friction disks.

Some rotation or slipping of the friction plates always exists because of transmitted torque. However, such rotational slipping is slight if the torque developed by the loading conditions does not exceed the torque that would be transmitted under slip conditions by a conventional torque limiter having the same spring loading.

In the embodiment of Figs. 1 and 2, the possibility of excessive friction on the tooth profiles by jamming of pinion teeth into the spaces between the teeth of the ring gears is avoided by constructing the teeth of larger pinion gears with sufficiently large addendums that the tooth ends bear against the metal surfaces between teeth on the ring gears. This contact on the tooth ends of the ring gears is made almost entirely of a rolling nature. As the smaller pinion or pinions have no tendency to jam between the teeth of the ring gears, their addendums are made sufficiently small to provide necessary clearance for the rings around the three pinions. Similar tooth construction principles apply, of course, to all of the embodiments described herein.

At one angular position on the friction plates, the initial rotational slip of the plates produced by excessive transmitted torque is in the opposite direction to the momentary velocity involved in the circular wobble. That is the position at which the movement of the ring gear provided by the eccentricity of the planetary gears is in a direction opposite to the direction of slipping involved between the inner and outer sets of friction plates because of the excessive transmitted torque. However, at all other angular positions on the plate the initial rotational slip is either in the same direction as the motion involved in the circular wobble, or at an angle less than 180 degrees to the motion. Therefore, the net breakaway torque is greatly reduced.

It is beneficial to practice the present invention in all torque-limiting applications and the like where there is a requirement that break-away torque be made equal to or nearly equal to slipping torque.

It will be understood, of course, that while the forms of the invention herein shown and described constitute preferred embodiments of the invention, it is not intended herein to illustrate all of the possible equivalent forms or ramifications of the invention. It will also be understood that the words used are words of description, rather than of limitation and that various changes, such as changes in shape, relative size and arrangement of parts, may be substituted without departing from the spirit or scope of the invention herein disclosed.

What is claimed is:

1. In combination: a housing having splines on its inner surface; a planetary gear train comprising a sun gear and an externally toothed planetary pinion mounted in said housing, a driving input shaft linked to said sun gear, a driven output shaft, and a carrying arm linking said pinion with said output shaft; a multiple friction disk torque-limiting device having alternately arranged sets of nonrotatable and rotatable disks normally spring pressed to frictional engagement, said nonrotatable disks being peripherally toothed to engage said splines on the inner surface of said housing, and said rotatable disks having internal teeth to mate with the external teeth of said pinion; said planetary gear train being arranged to move said pinion relative to said set of rotatable disks in such a manner that said pinion forces a continuous translating motion of said set of rotatable disks with respect to said set of nonrotatable disks.

2. In combination: a housing having splines on its inner surface; a planetary gear train comprising a sun gear and a plurality of externally toothed planetary pinions mounted in said housing and having a driving input shaft and a driven output shaft connected thereto, said shafts being arranged with their axes in line and at least one said pinion being of a different diameter than another said pinion; and a multiple friction disk torque-limiting device having alternately arranged sets of nonrotatable and rotatable disks normally spring pressed to frictional engagement, said nonrotatable disks being peripherally toothed to engage said splines on the inner surface of said housing, and said rotatable disks having internal teeth to mate with the external teeth of said pinions; so constructed and arranged that rotational movement of the axes of said pinions forces a translating motion of said set of rotatable disks with respect to said set of nonrotatable disks.

3. The device of claim 2 wherein the output shaft is driven by the planetary gear train by means of a spring key.

4. In combination: a housing having splines on its inner surface; a planetary gear train comprising a sun gear and at least one externally toothed planetary pinion mounted in said housing and having a driving input shaft linked to said sun gear, a driven output shaft, and carrying arms linking said pinion with said output shaft; and a multiple friction disk torque-limiting device having alternately arranged sets of nonrotatable and rotatable disks normally spring pressed to frictional engagement, said nonrotatable disks being peripherally toothed to engage said splines on the inner surface of said housing, and said rotatable disks having internal teeth to mate with the external teeth of said pinion; the diameter of said pinion being larger than the difference between the internal radius of said rotatable disks and the radius of said sun gear, whereby rotational movement of the axis of said pinion forces a translating motion of said set of rotatable disks with respect to said set of nonrotatable disks.

5. The device of claim 4 wherein the output shaft is resiliently driven by the planetary gear train.

6. In torque limiters for planetary gear trains; a multiple friction disk assembly comprising a first set of nonrotatable friction disks and a second set of rotatable ring gear friction disks arranged in frictional engagement with said first set; and means comprising a planetary gear train internally contacting said second set constructed and arranged to provide movement of at least one planetary gear in such a manner as to force a continuous translation of said second set with respect to said first set.

7. In combination: a housing having splines on its inner surface; a planetary gear train comprising a sun gear and a plurality of externally toothed planetary pinions mounted in said housing and having a driving input shaft and a driven output shaft connected thereto, said shafts being arranged with their axes in line; a multiple friction disk torque-limiting device having alternately arranged sets of nonrotatable and rotatable annular disks normally spring pressed to frictional engagement, said nonrotatable disks being peripherally toothed to engage said splines on the inner surface of said housing, and said rotatable disks having internal teeth to mate with the external teeth of said pinions; and carrying arms linking said pinions with said output shaft, said carrying arms and said pinions being characterized by such nonsymmetrical structure and arrangement that rotational movement of the axes of said pinions forces a substantially circular motion of the axis of said set of rotatable disks.

8. The device of claim 7 wherein the planetary pinions are equal in diameter and one of the carrying arms is longer than the others.

9. The device of claim 7 wherein one of the planetary pinions is a "dummy" gear which does not mesh with the sun gear.

10. In combination: a housing having splines on its inner surface; a planetary gear train comprising a sun gear and an externally toothed pinion mounted in said housing and having a driving input shaft and a driven output shaft displaced out of line with said input shaft connected thereto; and a multiple friction disk torque-limiting device having alternately arranged sets of stationary and rotatable disks normally spring pressed to frictional engagement, said stationary disks being peripherally toothed to engage said splines on the inner surface of said housing and said rotatable disks having internal teeth to mate with the external teeth of said pinion; so constructed and arranged that rotational movement of the axis of said pinion forces a substantially circular motion of the axis of said rotatable disks.

11. The device of claim 10 wherein the planetary pinions of the planetary gear train are equal in diameter.

12. In torque limiters for planetary gear trains: a planetary gear train comprising a sun gear and an externally toothed planetary pinion; a driving input shaft linked to said sun gear; a driven output shaft linked to said pinion; a multiple friction disk torque-limiting device having alternately arranged sets of nonrotatable and rotatable disks normally pressed to frictional engagement, said nonrotatable disks being unattached to said input and output shafts; and said rotatable disks having internal teeth to mate with the external teeth of said pinion; and, contacting said multiple friction disk torque-limiting device, mechanical forcing means for producing a continuous forced translation of one said set of friction disks with respect to the other said set of friction disks.

References Cited in the file of this patent

UNITED STATES PATENTS

| 1,625,793 | Chilton | Apr. 26, 1927 |
| 2,419,253 | Cahill | Apr. 22, 1947 |

FOREIGN PATENTS

| 941,197 | France | June 28, 1948 |